(12) United States Patent
Shirai et al.

(10) Patent No.: US 7,332,997 B2
(45) Date of Patent: Feb. 19, 2008

(54) REMOTE CONTROL DEVICE FOR VEHICLE

(75) Inventors: Tsuyoshi Shirai, Tokyo (JP); Seizi Watanabe, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 425 days.

(21) Appl. No.: 11/007,786

(22) Filed: Dec. 8, 2004

(65) Prior Publication Data

US 2005/0212651 A1    Sep. 29, 2005

(30) Foreign Application Priority Data

Dec. 11, 2003  (JP)  ............................. 2003-413386

(51) Int. Cl.
*G05B 23/02* (2006.01)
*H04Q 9/00* (2006.01)
*B60R 25/10* (2006.01)

(52) U.S. Cl. ...................... 340/3.9; 340/3.1; 340/3.7; 340/5.3; 340/426.36

(58) Field of Classification Search ................ 340/3.9, 340/3.1, 3.7, 5.3, 426.36

See application file for complete search history.

(56) References Cited

U.S. PATENT DOCUMENTS 6,924,735 B2 * 8/2005 Ueda et al. ............ 340/426.28
7,068,146 B2 * 6/2006 Sasaki et al. ............... 340/5.72

FOREIGN PATENT DOCUMENTS

JP    5-30377    4/1993

* cited by examiner

*Primary Examiner*—Jeffery Hofsass
*Assistant Examiner*—Scott Au
(74) *Attorney, Agent, or Firm*—Jordan and Hamburg LLP

(57) ABSTRACT

A door lock drive controller, after outputting a drive signal to a drive circuit of a door lock actuator based on a signal from a remote control terminal, outputs an answer back signal in the form of pulses to a lamp drive circuit to light a hazard lamp. In a buzzer drive controller, pulses are converted to waveforms with changing voltage values at a waveform converter. A repetitive pulse with frequencies that changes is generated by a frequency generator based on the waveform-converted pulses and, in accordance therewith, a buzzer is driven by an output unit. A whistle-like tone can be obtained by causing the frequency of the repetitive pulse to change in the direction of increase.

6 Claims, 2 Drawing Sheets

REMOTE CONTROL DEVICE FOR VEHICLE

TECHNOLOGY FIELD

The present invention relates to a remote controller for vehicle such as, for example, a keyless entry device that locks and unlocks a vehicle door in a non-contact manner; more specifically, it relates to improvement of an answer back sound that reports performance of operation.

BACKGROUND OF THE INVENTION

Keyless entry devices that lock and unlock vehicle doors in a non-contact manner by sending a wireless signal including an ID (identification code) from a remote control terminal are becoming increasingly used as remote controllers for vehicles.

With such a keyless entry device, when a vehicle receives a signal from a remote controller it compares the ID included in such signal with a registered ID, and if the two match, doors are unlocked, allowing keyless entry into the vehicle. To indicate that an operation such as this door unlocking has been properly performed in response to the instructions from the remote controller, an answer back sound, such as from a buzzer, is produced.

Such a keyless entry device has been disclosed, for example, in Japanese Laid-open Utility Model Application 5-30377.

However, for an answer back sound of a conventional keyless entry device, control is merely of a drive and non-drive of a buzzer, producing only a monotone with a frequency set, for example, at 4 kHz. When the surrounding environment is noisy this can be difficult to hear.

Increasing the volume is a conceivable measure for this, but this will cause a different problem of being too loud when a person is near the vehicle or when the surrounding environment is quiet.

A variable answer back sound would be an effective measure for this, but this would cause the problem of high cost, because for this, conventionally, a special IC has been needed.

SUMMARY OF THE INVENTION

Therefore, it is an object of the present invention, which was conceived in light of the above-described problems with the conventional art, to provide a remote controller for a vehicle with a low cost and having an answer back sound that is easy to hear.

The present invention relates to a remote controller for a vehicle, wherein an answer back circuit comprises a waveform converter that converts the waveform of a prescribed pulse based on an answer back signal, a frequency generator that generates a repetitive pulse with changing frequency based on the waveform-converted pulse, and an output unit that drives a sound generator in accordance with the repetitive pulse.

Because a sound generator is driven in accordance with a repetitive pulse with changing frequency, the present invention has the effect of the sound generator generating a pleasant answer back sound that can be heard even in a noisy environment.

An embodiment of the present invention will be explained.

DESCRIPTION OF THE PREFERRED EMBODIMENTS

Figure 1:
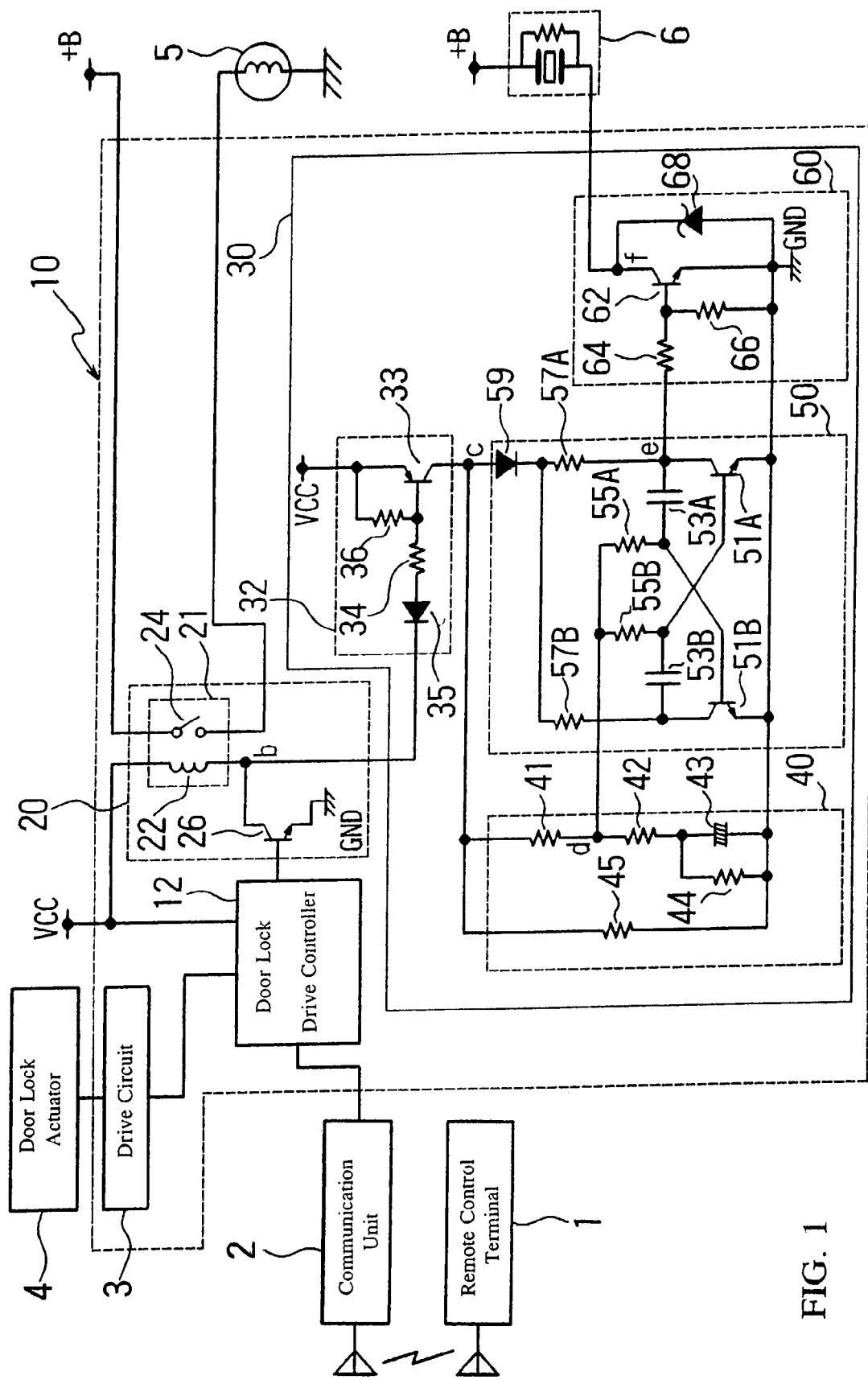
FIG. 1 shows an embodiment of the present invention as applied to a keyless entry device.

A keyless entry control device 10 (remote controller for a vehicle) of a vehicle can wirelessly connect with a remote control terminal 1 through a communication unit 2.

The remote control terminal 1, as is publicly known, comprises function buttons such as a lock button and unlock button (not shown in drawings), and with operation of such buttons sends door lock and unlock signals and ID data.

The keyless entry control device 10 is connected to the communication unit 2 as well as to a door lock actuator 4, a hazard lamp 5 and a piezoelectric buzzer 6.

The keyless entry control device 10 comprises as internal components a door lock drive controller 12, drive circuit 3, lamp drive circuit 20 and buzzer drive controller 30.

The door lock drive controller 12 is connected to the communication unit 2 and to the drive circuit 3. When a signal from the remote control terminal 1 is input via the communication unit 2, the door lock drive controller 12 compares an ID attached to the signal against a pre-registered ID and upon confirmation of a match outputs a drive signal for lock or unlock, depending on the signal, to the drive circuit 3. In accordance with the drive signal, the drive circuit 3 drives the door lock actuator 4 to lock or unlock.

Figure 2A:
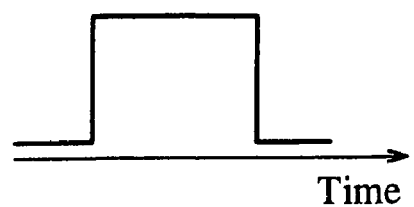
FIGS. 2(a) to 2(f) show waveforms for various sections of the embodiment.

After outputting the drive signal to the drive circuit 3, the door lock drive controller 12 outputs an answer back signal as shown in FIG. 2(a) to the lamp drive circuit 20.

The lamp drive circuit 20 performs answer back using the hazard lamp 5. The lamp drive circuit 20 comprises a relay 21 inserted at an intermediate point of a power supply wire to the hazard lamp 5 and an NPN transistor 26 for relay drive.

The NPN transistor 26 is constituted so that its base is connected to the door lock drive controller 12, it receives an answer back signal in the form of pulses of roughly 200 ms, the collector is connected to one end of a relay coil 22, and the emitter is grounded. The other end of the relay coil 22 is connected to a power source VCC.

One relay contact 24 is connected to a power source B and the other is connected to one terminal of the hazard lamp 5. The other terminal of the hazard lamp 5 is grounded to the ground GND.

When an answer back signal (FIG. 2(a)) is received from the door lock drive controller 12, the NPN transistor 26 is turned on, electricity flows to the relay coil 22 and the relay contacts 24 close, lighting the hazard lamp 5.

The answer back signal is output in one or two pulses, depending on whether it is a door lock or unlock signal, and in response thereto the hazard lamp 5 lights once or twice. In FIG. 2(a) a one-pulse answer back signal is output.

A buzzer drive controller 30 comprises a pulse voltage generator 32, waveform converter 40, frequency generator 50 and output unit 60.

Figure 2B:
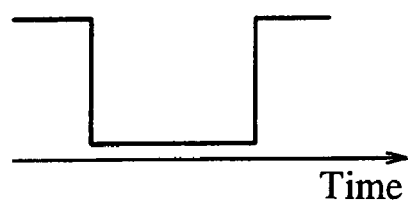

The pulse voltage generator 32 comprises a PNP transistor 33. The base of the PNP transistor 33 is connected, via a resistor 34 and a back stop diode 35, to the connection point b between the collector of the NPN transistor 26 and the relay coil 22 of the lamp drive circuit 20. The potential of the connection point b changes taking a form that is the inversion of the answer back signal, as shown in FIG. 2(b).

The emitter of the PNP transistor 33 is connected to the power source VCC, the emitter and the base are connected at a resistor 36, and the collector is connected to the waveform converter 40 and frequency generator 50.

Figure 2C:
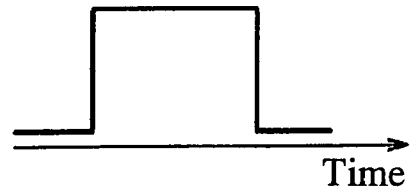

The PNP transistor 33 is usually turned off, as a power supply voltage is applied through the resistor 36 to the base, and it is turned on only when the NPN transistor 26 of the lamp drive circuit 20 is turned on and the base potential declines. Thus, the pulse voltage generator 32 is synchronized with the lighting of the hazard lamp 5 and a pulse voltage is output at output point c on the collector side as shown in FIG. 2(c). This drawing shows only one pulse.

The waveform converter 40 comprises resistors 41 and 42 connected in series between the output point c on the output side of the pulse voltage generator 32 and the ground GND, and a capacitor 43; the potential of the connection point d between the resistors 41 and 42 is output to the frequency generator 50 as output voltage. The waveform converter 40 comprises a resistor 44 disposed between both ends of the capacitor 43, and a resistor 45 disposed between the point of connection with output point c of the above resistor 41 and the ground GND. A charge-discharge circuit of the capacitor 43 is thus constituted.

When a pulse voltage is applied from the pulse voltage generator 32, first the potential of the connection point d becomes divided voltage through resistors 41 and 42. Thereafter, as the capacitor 43 becomes charged, the terminal voltage of the capacitor 43 increases, and the terminal voltage of the capacitor 43 is added to the potential of the connection point d.

Figure 2D:
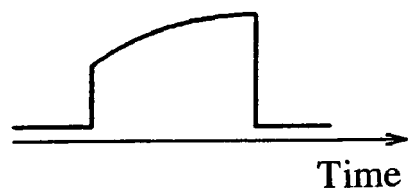

Thus the output voltage of the waveform converter 40, as shown in FIG. 2(d), changes so as to increase in a non-linear manner moving from the low point, at rise time, to maximum terminal voltage when the capacitor 43 is fully charged.

Because the resistor 44 is disposed in parallel with the capacitor 43, the maximum terminal voltage of the connection point d is kept constant even if characteristics of the capacitor 43 change due to temperature; thus the likelihood diminishes that the above non-linear changes of the output voltage will be influenced by ambient temperature.

The resistor 45 adjusts current flow to the capacitor 43 side and forms a discharge path for the capacitor 43 after the pulse voltage from the pulse voltage generator 32 is gone.

The frequency generator 50 forms an oscillation circuit based on a multi vibrator comprising two sets of NPN transistor 51 (51A and 51B) and capacitor 53 (53A and 53B).

One set will be explained. One end of the capacitor 53A is connected to the collector of the NPN transistor 51A having its emitter connected to the ground GND, and the other end of the capacitor 53A is connected to the output (connection point d) of the waveform converter 40 via resistor 55A.

The collector of the NPN transistor 51A is further connected to the output point c of the pulse voltage generator 32 via a resistor 57A and a back stop diode 59.

The other set that includes NPN transistor 51B has the same constitution.

The other end of the respective capacitors 53A and 53B are connected to the base of the NPN transistor 51 that belongs to the other set (i.e., NPN transistor 51B and 51A, respectively).

An output unit 60 is connected to the connection point e between the NPN transistor 51A collector and the capacitor 53B.

The back stop diode 59 is also constituted so as not to be easily influenced by ambient temperature. When the ambient temperature is high, the voltage that turns on the NPN transistor 51 decreases and frequency increases; however, at high temperature, the voltage drop of the back stop diode 59 decreases, and as a result voltage applied to the resistor 57 increases and frequency decreases. When ambient temperature is low, the opposite characteristics obtain.

When output from the waveform converter 40 is applied to the base of an NPN transistor 51 via the resistor 55, turning on, for example, NPN transistor 51A, the potential of the other end of the capacitor 53A paired with the transistor that has been turned on declines and the NPN transistor 51B (belonging to the other pair) remains off.

While the NPN transistor 51A is on, the capacitor 53A charges. When the potential of the other end reaches a prescribed value, the NPN transistor 51B (belonging to the other pair) is turned on and the NPN transistor 51A is turned off.

Figure 2E:
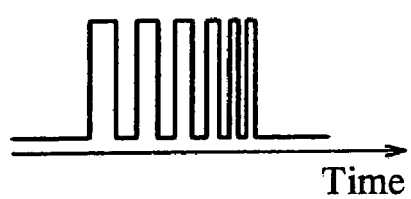

In this way, the NPN transistors 51A and 51B alternatingly turn on and off. Here, the voltage input from the waveform converter 40, as shown in FIG. 2(d), changes in the direction from lower to higher voltage, and the time required for charging the capacitor 53 moves from relatively long to relatively short. As a result, as shown in FIG. 2(e), a repetitive pulse with frequency changing from lower to higher, that is, with pulse width changing from large to small, is output to the output unit 60.

The output unit 60 comprises an NPN transistor 62 connected in series with a buzzer connected to the power source B. That is, the collector of the NPN transistor 62 is connected to the buzzer 6 and the emitter is connected to the ground GND.

The base is connected to the connection point e in the frequency generator 50 between the NPN transistor 51A collector and the capacitor 53A via a resistor 64, and is connected to the ground via a resistor 66. A Zener diode 68 for surge protection is connected between the collector and emitter.

Figure 2F:
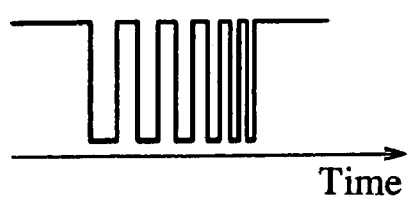

The NPN transistor 62 is turned on and off according to the repetitive pulse from the frequency generator 50 and the potential of the output point f with respect to the buzzer 6 is shown in FIG. 2(f). In this manner the buzzer 6 is pulse driven.

Although there may be slight differences depending on properties of the buzzer 6, a whistle-like tone can be obtained by changing the frequency of the repetitive pulse at around 2 kHz for example.

In this embodiment, an answer back circuit of the present invention is constituted by the hazard lamp 5, lamp drive circuit 20, buzzer 6 and buzzer drive controller 30. Also, a lamp constitutes the hazard lamp 5 and a sound generator constitutes the buzzer 6.

The present embodiment constituted as set forth above provides a keyless entry device 10, wherein a pulse voltage generated at the pulse voltage generator 32 based on an answer back signal output from the door lock drive controller 12 is subject to waveform conversion at the waveform converter 40; in accordance therewith, a repetitive pulse with changing frequency is generated by the frequency generator 50 and the buzzer 6 is driven by the output unit 60 according to the repetitive pulse; therefore, an easy-to-hear answer back sound with varying pitch can be obtained.

The waveform converter 40 can be realized using a simple constitution because changes to the voltage value by a charge-discharge circuit are within the pulse width of the answer back signal.

Also, the frequency generator 50 is constituted by an oscillation circuit that varies oscillation pulse width in accordance with the voltage value, and thus can be simply constituted based on the multi-vibrator.

A pleasant, whistle-like tone can be obtained by causing the frequency of the repetitive pulse to change in the increasing direction.

The present embodiment sets forth the invention as applied to a keyless entry device. However, the present invention is not limited to the foregoing and can be used in a variety of remote controllers that performs answer back for a vehicle.

Also, in the embodiment, a hazard lamp is used as a lamp and a buzzer is used as a sounds generator, but other lamps and speakers can also be used.

LEGENDS

1 REMOTE CONTROL TERMINAL (TERMINAL)
2 COMMUNICATION UNIT
3 DRIVE CIRCUIT
4 DOOR LOCK ACTUATOR
5 HAZARD LAMP (LAMP)
6 BUZZER (SOUND GENERATOR)
10 KEYLESS ENTRY CONTROL DEVICE (REMOTE CONTROLLER FOR A VEHICLE)
12 DOOR LOCK DRIVE CONTROLLER
20 LAMP DRIVE CIRCUIT
21 RELAY
22 RELAY COIL
24 RELAY CONTACT
26, 51A, 51B AND 62 NPN TRANSISTORS
30 BUZZER DRIVE CONTROLLER
32 PULSE VOLTAGE GENERATOR
33 PNP TRANSISTOR
34, 36, 41, 42, 44, 45, 55A, 55B, 57A, 57B, 64, 66 RESISTORS
35, 59 BACK STOP DIODE
40 WAVEFORM CONVERTER
43, 53A AND 53B CAPACITORS
50 FREQUENCY GENERATOR
60 OUTPUT UNIT
68 ZENER DIODE
GND GROUND

The invention claimed is:

1. A remote controller for a vehicle comprising:
    an answer back circuit that upon receipt of instruction signals from a terminal executes a prescribed control and reports execution of such control based on an answer back signal;
    said answer back circuit comprising a waveform conversion unit for waveform conversion of a prescribed pulse based on the answer back signal;
    said waveform conversion unit comprising a charge-discharge circuit and outputs a pulse with changing voltage value within a pulse width corresponding to said prescribed pulse;
    a frequency generation unit for generating a repetitive pulse with changing frequency based on said waveform converted-pulse; and
    an output unit that drives a sound generator in accordance with said repetitive pulse.

2. A remote controller for a vehicle according to claim 1, wherein said frequency generation unit comprises an oscillation circuit and causes such oscillation pulse width to change in accordance with said voltage value.

3. A remote controller for a vehicle according to claim 2, wherein said answer back circuit further comprises a lamp drive circuit, and a lamp is lighted based on said answer back signal.

4. A remote controller for a vehicle according to claim 1, wherein said answer back circuit further comprises a lamp drive circuit, and a lamp is lighted based on said answer back signal.

5. A remote controller for a vehicle comprising:
    an answer back circuit that upon receipt of instruction signals from a terminal executes a prescribed control and reports execution of such control based on an answer back signal;
    said answer back circuit comprising a waveform conversion unit for waveform conversion of a prescribed pulse based on the answer back signal,
    a frequency generation unit for generating a repetitive pulse with changing frequency based on said waveform-converted pulse;
    said frequency generation unit changing the frequency of said repetitive pulse so as to increase; and
    an output unit that drives a sound generator in accordance with said repetitive pulse.

6. A remote controller for a vehicle according to claim 5, wherein said answer back circuit further comprises a lamp drive circuit, and a lamp is lighted based on said answer back signal.

* * * * *